(12) United States Patent
Nefcy et al.

(10) Patent No.: US 10,189,468 B2
(45) Date of Patent: Jan. 29, 2019

(54) PADDLE SHIFTER CONTROL OF HYBRID POWERTRAIN

(71) Applicant: FORD GLOBAL TECHNOLOGIES, LLC, Dearborn, MI (US)

(72) Inventors: Bernard D. Nefcy, Novi, MI (US); Ming Lang Kuang, Canton, MI (US); Brian Thomas Soo, West Bloomfield, MI (US); Stuart N. Ford, Farmington Hills, MI (US); Mark Davison, Dearborn, MI (US); Matthew Joseph Meinhart, Royal Oak, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 442 days.

(21) Appl. No.: 15/054,947

(22) Filed: Feb. 26, 2016

(65) Prior Publication Data

US 2017/0247027 A1    Aug. 31, 2017

(51) Int. Cl.
*B60W 50/08*      (2012.01)
*B60W 20/30*      (2016.01)
(Continued)

(52) U.S. Cl.
CPC ............... *B60W 20/30* (2013.01); *B60K 6/48* (2013.01); *B60K 6/54* (2013.01); *B60W 10/08* (2013.01); *B60W 10/11* (2013.01); *B60W 30/18127* (2013.01); *B60W 50/082* (2013.01); *B60W 50/087* (2013.01); *B60W 50/14* (2013.01); *F16H 61/0204* (2013.01); *F16H 63/42* (2013.01); *B60W 50/12* (2013.01); *B60W 2050/146* (2013.01); *B60W 2510/1005* (2013.01); *B60W 2510/1025* (2013.01); *B60W 2510/244* (2013.01); *B60W 2540/04* (2013.01); *B60W 2540/10* (2013.01); *B60W 2540/12* (2013.01); *B60W 2540/16* (2013.01); *B60W 2710/083* (2013.01); *B60W 2710/1005* (2013.01); *B60Y 2200/92* (2013.01); *B60Y 2300/60* (2013.01); *B60Y 2300/70* (2013.01);
(Continued)

(58) Field of Classification Search
CPC ............... B60W 50/12; B60W 50/087; B60W 2050/146; B60W 50/14
See application file for complete search history.

(56) References Cited

U.S. PATENT DOCUMENTS 7,704,187 B2    4/2010    Saito et al.
8,630,775 B2 *   1/2014    Kitaori ................ F16H 61/0213
                                                             477/107

(Continued)

*Primary Examiner* — Sherry L Estremsky
(74) *Attorney, Agent, or Firm* — David Kelley; Brooks Kushman P.C.

(57) ABSTRACT

A vehicle comprises a hybrid powertrain includes an electric machine coupled between an automatic gearbox and an engine. The vehicle includes paddle shifters configured to output a driver requested gear change. The hybrid powertrain is configured to selectively operate in an economy mode that optimizes fuel economy. While operating in the economy mode, a controller may selectively inhibit the driver requested gear change when the change may negatively impact fuel economy. In the economy mode, the driver requested gear change may be inhibited during a demand for braking. If the driver requested gear change is a downshift request, the downshift is inhibited and simulated using electric machine torque.

19 Claims, 2 Drawing Sheets

(51) Int. Cl.
*B60K 6/54* (2007.10)
*B60W 10/08* (2006.01)
*B60W 10/11* (2012.01)
*B60W 30/18* (2012.01)
*B60W 50/14* (2012.01)
*F16H 61/02* (2006.01)
*F16H 63/42* (2006.01)
*B60K 6/48* (2007.10)
*B60W 50/12* (2012.01)

(52) U.S. Cl.
CPC ............ *Y02T 10/84* (2013.01); *Y10S 903/917* (2013.01); *Y10S 903/93* (2013.01)

(56) References Cited

U.S. PATENT DOCUMENTS

| | | |
|---|---|---|
| 8,831,842 B2 | 9/2014 | Dufford |
| 8,942,876 B2 | 1/2015 | Dai et al. |
| 8,998,770 B2 * | 4/2015 | Wang .................... B60W 20/30 477/3 |
| 9,068,649 B2 * | 6/2015 | Trush ................. F16H 61/0213 |
| 9,120,483 B2 * | 9/2015 | Sato ........................ B60K 6/445 |
| 9,273,777 B2 * | 3/2016 | Tanaka .................... B60K 6/445 |
| 9,657,833 B2 * | 5/2017 | Fairgrieve .............. B60K 28/16 |
| 2015/0006039 A1 | 1/2015 | Hyun |
| 2018/0079428 A1 * | 3/2018 | Sickart ................ F16H 61/0204 |

* cited by examiner

PADDLE SHIFTER CONTROL OF HYBRID POWERTRAIN

TECHNICAL FIELD

This application generally relates to a system for managing driver requested gear changes in a hybrid powertrain.

BACKGROUND

An automotive vehicle includes various control mechanisms for controlling vehicle operation. A vehicle with an automatic transmission includes a control mechanism, typically a lever of some type, for selecting a driving mode of the automatic transmission. The driving mode may be one of PARK, DRIVE, NEUTRAL, and DRIVE. In DRIVE mode, the automatic transmission may automatically select the gear of the transmission.

In some vehicles with automatic transmissions, paddle shifters may be present that allow the driver to override the automatically selected gear of the transmission. Such operation provides the driver with a sense of additional control over vehicle operation. The paddle shifters allow a driver to override the automatic gear selection with a driver selected gear selection.

SUMMARY

In some configurations, a vehicle includes a controller programmed to change a gear of a transmission in a hybrid powertrain in response to receiving a request from a paddle shifter and, in response to the hybrid powertrain operating in an economy mode and receiving the request in a presence of a brake demand signal indicative of a demand for braking, maintain the gear in an automatically selected gear.

Some configurations may include one or more of the following features. The vehicle may include a lamp associated with the paddle shifter in which the controller is programmed to flash the lamp for a predetermined time after the request in response to maintaining the gear. The vehicle may include a lamp associated with the paddle shifter in which the controller is programmed to change a color of the lamp for a predetermined time after the request in response to maintaining the gear. The vehicle in which the controller is programmed to, in response to the hybrid powertrain operating in a mode other than the economy mode and receiving the request in an absence of the brake demand signal being indicative of the demand for braking, change the gear according to the request and decrease a performance score that is displayed to a driver. The vehicle in which the controller is programmed to choose the automatically selected gear to maximize an amount of regenerative energy recovered by an electric machine in the hybrid powertrain. The vehicle in which the controller is programmed to, in response to the request being a downshift request in a presence of brake demand and accelerator demand signals that are indicative of a coastdown condition, maintain the gear and change a torque of an electric machine to simulate an expected torque change due to downshifting. The vehicle in which the controller is programmed to request the expected torque change based on a present gear of the transmission, a requested gear, and a present torque input to the transmission. The vehicle in which the controller is programmed to cease simulating the expected torque change in response the brake demand signal being indicative of a demand for braking or the accelerator demand signal being indicative of a demand for acceleration of the vehicle.

In some configurations, a hybrid powertrain includes a controller programmed to change a gear of a transmission in response to receiving a request from a paddle shifter and, in response to the hybrid powertrain operating in an economy mode and receiving a downshift request in a presence of brake demand and accelerator demand signals indicative of a coastdown condition, increase a regenerative torque command for an electric machine by a predetermined amount without changing the gear.

Some configurations may include one or more of the following features. The hybrid powertrain in which the controller is programmed to, in response to the brake demand signal being indicative of a demand for braking, increase the regenerative torque command of the electric machine according to the brake demand signal. The hybrid powertrain in which the controller is programmed to, in response to a state of charge of a battery exceeding a battery full threshold, reduce the regenerative torque command and downshift the transmission. The hybrid powertrain in which the controller is programmed to, in response to operating the hybrid powertrain in a mode other than the economy mode and receiving the downshift request in a presence of the brake demand signal being indicative of a demand for braking, downshift the transmission and decrease a performance score for display. The hybrid powertrain in which the controller is programmed to increase the regenerative torque command by the predetermined amount that is based on a present gear of the transmission, a requested gear, and a present torque input to the transmission. The hybrid powertrain in which the controller is programmed to cease requesting the regenerative torque command in response to the accelerator demand signal being indicative of a demand for acceleration.

In some configurations, a method includes maintaining by a controller an automatically selected gear of a transmission of a hybrid powertrain in response to receiving a gear change request from a driver while the hybrid powertrain is operating in an economy mode and a brake demand signal is indicative of a demand for braking. The method also includes outputting by the controller a signal indicative of a gear change denial to a display.

Some configurations may include one or more of the following features. The method may include increasing by the controller a regenerative torque command to an electric machine and inhibiting the gear change request in response to the gear change request being a downshift request while the hybrid powertrain is operating in the economy mode and the brake demand signal is indicative of an absence of demand for braking and an accelerator demand signal is indicative of an absence of demand for acceleration. The method may include shifting by the controller a gear from the automatically selected gear according to the gear change request in response to receiving the gear change request when the hybrid powertrain is operating in a mode other than the economy mode. The method may include outputting by the controller a signal indicative of a decreased performance score in a presence of the brake demand signal being indicative of a demand for braking and the gear change request resulting in collection of less regenerative energy than operating in the automatically selected gear. The method may include generating by the controller the automatically selected gear to minimize fuel consumption when the hybrid powertrain is operating in the economy mode. The method may include changing by the controller a gear of the transmission according to the automatically selected gear and ceasing to output the signal indicative of the gear change denial in response to the gear change request matching the automatically selected gear.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
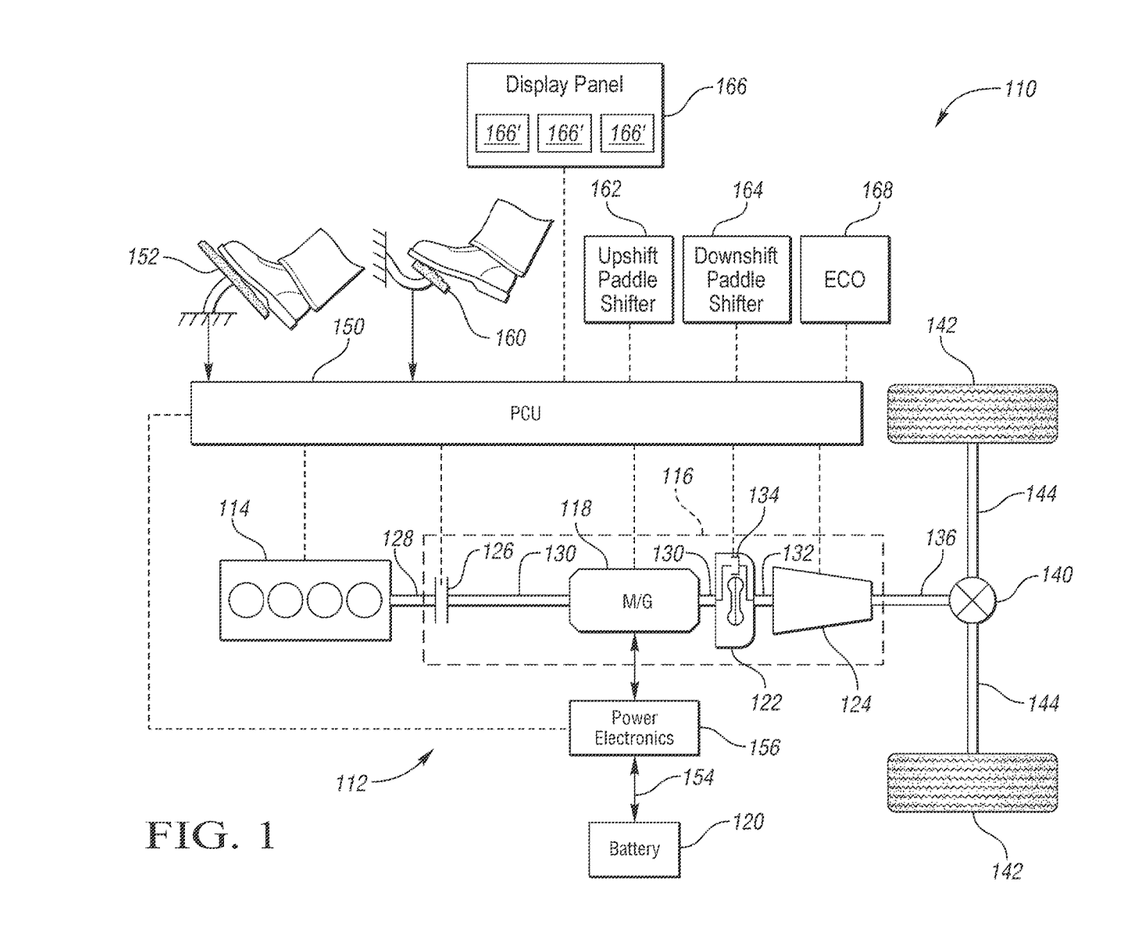
FIG. 1 is a block diagram of a vehicle with a hybrid powertrain.

Referring to FIG. 1, a schematic diagram of a hybrid electric vehicle (HEV) 110 is illustrated according to an embodiment of the present disclosure. FIG. 1 illustrates representative relationships among the components. Physical placement and orientation of the components within the vehicle may vary. The HEV 110 includes a powertrain 112. The powertrain 112 includes an engine 114 that drives a transmission 116, which may be referred to as a modular hybrid transmission (MHT). As will be described in further detail below, transmission 116 includes an electric machine such as an electric motor/generator (M/G) 118, an associated traction battery 120, a torque converter 122, and a multiple step-ratio automatic transmission, or gearbox 124.

The engine 114 and the M/G 118 are both drive sources for the HEV 110. The engine 114 generally represents a power source that may include an internal combustion engine such as a gasoline, diesel, or natural gas powered engine, or a fuel cell. The engine 114 generates an engine power and corresponding engine torque that is supplied to the M/G 118 when a disconnect clutch 126 between the engine 114 and the M/G 118 is at least partially engaged. The M/G 118 may be implemented by any one of a plurality of types of electric machines. For example, M/G 118 may be a permanent magnet synchronous motor. Power electronics 156 condition direct current (DC) power provided by the battery 120 to the requirements of the M/G 118, as will be described below. For example, power electronics may provide three phase alternating current (AC) to the M/G 118.

When the disconnect clutch 126 is at least partially engaged, power flow from the engine 114 to the M/G 118 or from the M/G 118 to the engine 114 is possible. For example, the disconnect clutch 126 may be engaged and M/G 118 may operate as a generator to convert rotational energy provided by a crankshaft 128 and M/G shaft 130 into electrical energy to be stored in the battery 120. The disconnect clutch 126 can also be disengaged to isolate the engine 114 from the remainder of the powertrain 112 such that the M/G 118 can act as the sole drive source for the HEV 110. Shaft 130 extends through the M/G 118. The M/G 118 is continuously drivably connected to the shaft 130, whereas the engine 114 is drivably connected to the shaft 130 only when the disconnect clutch 126 is at least partially engaged.

The M/G 118 is connected to the torque converter 122 via shaft 130. The torque converter 122 is therefore connected to the engine 114 when the disconnect clutch 126 is at least partially engaged. The torque converter 122 includes an impeller fixed to M/G shaft 130 and a turbine fixed to a transmission input shaft 132. The torque converter 122 thus provides a hydraulic coupling between shaft 130 and transmission input shaft 132. The torque converter 122 transmits power from the impeller to the turbine when the impeller rotates faster than the turbine. The magnitude of the turbine torque and impeller torque generally depend upon the relative speeds. When the ratio of impeller speed to turbine speed is sufficiently high, the turbine torque is a multiple of the impeller torque. A torque converter bypass clutch 134 may also be provided that, when engaged, frictionally or mechanically couples the impeller and the turbine of the torque converter 122, permitting more efficient power transfer. The torque converter bypass clutch 134 may be operated as a launch clutch to provide smooth vehicle launch. Alternatively, or in combination, a launch clutch similar to disconnect clutch 126 may be provided between the M/G 118 and gearbox 124 for applications that do not include a torque converter 122 or a torque converter bypass clutch 134. In some applications, disconnect clutch 126 is generally referred to as an upstream clutch and launch clutch 134 (which may be a torque converter bypass clutch) is generally referred to as a downstream clutch.

The gearbox 124 may include gear sets (not shown) that are selectively placed in different gear ratios by selective engagement of friction elements such as clutches and brakes (not shown) to establish the desired multiple discrete or step drive ratios. The gearbox 124 may provide a predetermined number of gear ratios that may range from a low gear (e.g., first gear) to a highest gear (e.g., Nth gear). An upshift of the gearbox 124 is a transition to a higher gear. A downshift of the gearbox 124 is a transition to a lower gear. The friction elements are controllable through a shift schedule that connects and disconnects certain elements of the gear sets to control the ratio between a transmission output shaft 136 and the transmission input shaft 132. The gearbox 124 is automatically shifted from one ratio to another based on various vehicle and ambient operating conditions by an associated controller, such as a powertrain control unit (PCU) 150. The gearbox 124 then provides powertrain output torque to output shaft 136.

It should be understood that the hydraulically controlled gearbox 124 used with a torque converter 122 is but one example of a gearbox or transmission arrangement; any multiple ratio gearbox that accepts input torque(s) from an engine and/or a motor and then provides torque to an output shaft at the different ratios is acceptable for use with embodiments of the present disclosure. For example, gearbox 124 may be implemented by an automated mechanical (or manual) transmission (AMT) that includes one or more servo motors to translate/rotate shift forks along a shift rail to select a desired gear ratio. As generally understood by those of ordinary skill in the art, an AMT may be used in applications with higher torque requirements, for example.

As shown in the representative embodiment of FIG. 1, the output shaft 136 is connected to a differential 140. The differential 140 drives a pair of wheels 142 via respective axles 144 connected to the differential 140. The differential 140 transmits approximately equal torque to each wheel 142 while permitting slight speed differences such as when the vehicle turns a corner. Different types of differentials or similar devices may be used to distribute torque from the powertrain to one or more wheels. In some applications, torque distribution may vary depending on the particular operating mode or condition, for example.

The powertrain 112 further includes an associated powertrain control unit (PCU) 150. While illustrated as one controller, the PCU 150 may be part of a larger control system and may be controlled by various other controllers throughout the vehicle 110, such as a vehicle system controller (VSC). It should therefore be understood that the powertrain control unit 150 and one or more other controllers can collectively be referred to as a "controller" that controls various actuators in response to signals from various sensors to control functions such as starting/stopping engine 114, operating M/G 118 to provide wheel torque or charge battery 120, select or schedule transmission shifts, etc. Controller 150 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

The controller 150 communicates with various engine/vehicle sensors and actuators via an input/output (I/O) interface that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. As generally illustrated in the representative embodiment of FIG. 1, PCU 150 may communicate signals to and/or from engine 114, disconnect clutch 126, M/G 118, launch clutch 134, transmission gearbox 124, and power electronics 156. Although not explicitly illustrated, those of ordinary skill in the art will recognize various functions or components that may be controlled by PCU 150 within each of the subsystems identified above. Representative examples of parameters, systems, and/or components that may be directly or indirectly actuated using control logic executed by the controller include fuel injection timing, rate, and duration, throttle valve position, spark plug ignition timing (for spark-ignition engines), intake/exhaust valve timing and duration, front-end accessory drive (FEAD) components such as an alternator, air conditioning compressor, battery charging, regenerative braking, M/G operation, clutch pressures for disconnect clutch 126, launch clutch 134, and transmission gearbox 124, and the like. Sensors communicating input through the I/O interface may be used to indicate turbocharger boost pressure, crankshaft position (PIP), engine rotational speed (RPM), wheel speeds (WS1, WS2), vehicle speed (VSS), coolant temperature (ECT), intake manifold pressure (MAP), accelerator pedal position (PPS), ignition switch position (IGN), throttle valve position (TP), air temperature (TMP), exhaust gas oxygen (EGO) or other exhaust gas component concentration or presence, intake air flow (MAF), transmission gear, ratio, or mode, transmission oil temperature (TOT), transmission turbine speed (TS), torque converter bypass clutch 134 status (TCC), deceleration or shift mode (MDE), for example.

Control logic or functions performed by PCU 150 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as PCU 150. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

An accelerator pedal 152 is used by the driver of the vehicle to provide a demanded torque, power, or drive command to propel the vehicle. In general, depressing and releasing the pedal 152 generates an accelerator pedal position signal that may be interpreted by the controller 150 as a demand for increased power or decreased power, respectively. Based at least upon input from the pedal, the controller 150 commands torque from the engine 114 and/or the M/G 118. The controller 150 also controls the timing of gear shifts within the gearbox 124, as well as engagement or disengagement of the disconnect clutch 126 and the torque converter bypass clutch 134. Like the disconnect clutch 126, the torque converter bypass clutch 134 can be modulated across a range between the engaged and disengaged positions. This produces a variable slip in the torque converter 122 in addition to the variable slip produced by the hydrodynamic coupling between the impeller and the turbine. Alternatively, the torque converter bypass clutch 134 may be operated as locked or open without using a modulated operating mode depending on the particular application.

To drive the vehicle with the engine 114, the disconnect clutch 126 is at least partially engaged to transfer at least a portion of the engine torque through the disconnect clutch 126 to the M/G 118, and then from the M/G 118 through the torque converter 122 and gearbox 124. The M/G 118 may assist the engine 114 by providing additional power to turn the shaft 130. This operation mode may be referred to as a "hybrid mode" or an "electric assist mode."

To drive the vehicle with the M/G 118 as the sole power source, the power flow remains the same except the disconnect clutch 126 isolates the engine 114 from the remainder of the powertrain 112. Combustion in the engine 114 may be disabled or otherwise OFF during this time to conserve fuel. The traction battery 120 transmits stored electrical energy through wiring 154 to power electronics 156 that may include an inverter, for example. The power electronics 156 convert DC voltage from the battery 120 into AC voltage to be used by the M/G 118. The PCU 150 commands the power electronics 156 to convert voltage from the battery 120 to an AC voltage provided to the M/G 118 to provide positive or negative torque to the shaft 130. This operation mode may be referred to as an "electric only" operation mode.

In any mode of operation, the M/G 118 may act as a motor and provide a driving force for the powertrain 112. Alternatively, the M/G 118 may act as a generator and convert kinetic energy from the powertrain 112 into electric energy to be stored in the battery 120. The M/G 118 may act as a generator while the engine 114 is providing propulsion power for the vehicle 110, for example. The M/G 118 may additionally act as a generator during times of regenerative braking in which rotational energy from spinning wheels 142 is transferred back through the gearbox 124 and is converted into electrical energy for storage in the battery 120.

A brake pedal 160 is used by the driver of the vehicle to provide a brake demand signal for braking or negative torque to slow the vehicle. In general, depressing and releasing the brake pedal 160 generates a brake pedal position signal that may be interpreted by the controller 150 as a demand for increased braking or decreased braking, respectively. Based at least upon input from the brake pedal 160, the controller 150 commands braking torque from vehicle brakes (not illustrated). The vehicle brakes generally include friction brakes. The M/G 118 may additionally act as a generator to provide regenerative braking, in which rotational energy from spinning wheels 142 is transferred back through the gearbox 124 and is converted into electrical energy for storage in the battery 120.

The vehicle 110 may include one or more paddle shifters 162 and 164 that are configured to output a request signal to change a gear of the gearbox 124. The vehicle 110 may include an upshift paddle shifter 162 and a downshift paddle shifter 164. In a preferred embodiment, the paddle shifters 162 and 164 are arranged on a vehicle steering wheel. In other embodiments, the paddle shifters 162 and 164 may be physical or virtual buttons on a dashboard or other appropriate inputs. In some configurations, the paddle shifters 162 and 164 may be implemented as a single mechanism that has a first position for an upshift and a second position for a downshift. The paddle shifters 162 and 164 are in communication with the controller 150. The controller 150 may be configured to upshift the gearbox 124 in response to a driver activation of the upshift paddle shifter 162. The controller 150 may be configured to downshift the gearbox 124 in response to the driver activation of the downshift paddle shifter 164. The response to activation of the paddle shifters 162 and 164 will be discussed in further detail below.

The vehicle 110 additionally includes a display panel 166 including a plurality of display elements 166'. In one embodiment, the display panel 166 is a multi-function digital display, and the display elements 166' are icons that are selectively shown on the display 166. In another embodiment, the display elements 166' are warning lamps that are selectively illuminated in a vehicle dashboard display. The display elements 166' may include a braking energy score that indicates a performance score of the driver relative to a total possible braking energy score.

The display elements 166' may include an indicator of a paddle shifter requested gear number. The display elements 166' may include an indicator of an actual gear number of the transmission. The display elements 166' may be further configured to have selectable color of the indicator. The display elements 166' may be further configured to flash or blink at a selectable rate to draw attention to the display elements 166'.

The vehicle 110 additionally includes an economy mode selector 168. The economy mode selector 168 may be a button or switch that is in communication with the PCU 150. The economy mode selector 168 may be a physical or virtual button on the dashboard or other appropriate inputs. The economy mode selector 168 may be utilized to place the PCU 150 in an operating mode that is configured to optimize fuel economy (e.g., ECO mode). The economy mode selector 168 may be configured to permit the driver to enter and exit the ECO mode on demand.

It should be understood that the schematic illustrated in FIG. 1 is merely exemplary and is not intended to be limited. Other configurations are contemplated that utilize selective engagement of both an engine and a motor to transmit torque through the transmission. For example, the M/G 118 may be offset from the crankshaft 128, an additional motor may be provided to start the engine 114, and/or the M/G 118 may be provided between the torque converter 122 and the gearbox 124. Other configurations are contemplated without deviating from the scope of the present disclosure.

The PCU 150 may be programmed to operate the powertrain 112 in different driving modes. For example, a driver may be provided with input devices to select between normal, performance, and economy modes. The PCU 150 may be programmed to automatically select a gear of the transmission in each of the operating modes based on different criteria. The PCU 150 may transition to the economy operating mode that optimizes fuel economy. The PCU 150 may be configured to automatically select a gear of the gearbox 124 to minimize fuel consumption. In addition, during braking, the PCU 150 may be configured to select a gear of the gearbox 124 that maximizes regenerative energy through the M/G 118 to the battery 120. The PCU 150 may implement a regenerative braking shift schedule to select the optimal gear during regenerative braking. When the PCU 150 is configured as such, any manual selections made by the driver using the paddle shifters 162 and 164 may impact fuel economy. Such manual operation may override the intent of the economy mode as selected by the economy mode selector 168.

During driving, the driver may actuate the paddle shifters 162 and 164 to control the gear of the transmission 124. Such operation may enhance the driving experience and may permit deceleration using the powertrain 112 instead of the friction brakes. The PCU 150 may be programmed to accommodate the driver's gear change request in most situations. However, the PCU 150 may be programmed to decline some shift requests to protect the powertrain 112. For example, some gear selections may cause the engine 114 to operate at a speed that is too high or too low to operate the engine without added emissions or damage (e.g., misfire).

In the case of using the paddle shifters 162 and 164 during operation in the economy mode, the driver may select a gear that limits or eliminates the collection of regenerative energy. The selection may normally be honored as there may be no restrictions associated with the selection. For example, the selected gear may operate the engine within the accepted speed range. However, operation in the driver selected gear may result in a reduction in the amount of regenerative energy that may be collected during a deceleration event. Such operation may lead to reduced fuel economy that contrasts with the economy mode selection.

When operating in the economy mode (e.g., economy mode selector 168 is pressed or otherwise activated), the PCU 150 may be programmed to deny some gear shift requests from the driver. The PCU 150 may be configured to favor fuel economy over performance while in the economy mode. A conflict exists when the requested gear reduces the energy collected and stored into the battery 120 while operating in the economy mode. Further, a conflict exists when the requested gear increases the amount of fuel that is needed. The PCU 150 may be programmed to inhibit or deny a driver gear request (e.g., from the paddle shifters 162 and 164) that reduces fuel economy while operating in the economy mode.

The denial of the driver gear request is not without precedence as already described. The driver gear request may be denied when the requested gear can cause damage to the engine or impacts emissions. Drivers may not be concerned with the gear shift denial provided there is an acceptable reason for the denial of the shift. Fuel economy may be an acceptable reason for economy-focused drivers.

In some configurations, the PCU 150 may be programmed to deny or inhibit driver selected gear shifts that negatively impact fuel economy while operating in the economy mode. In other configurations, the PCU 150 may be programmed to permit the driver selected gear shift and exit the economy mode if the gear shift causes a reduction in fuel economy.

While operating in modes other than the economy mode, the PCU 150 may be programmed to change the gear of the transmission in response to receiving a request from the paddle shifters 162 and 164. When the economy mode selector 168 is not engaged or actuated, the PCU 150 may be programmed to respond to the paddle shifters 162 and 164 in the normal manner. That is, requested gears shifts are honored within standard operational limits to prevent powertrain damage or emission reductions. When the brake pedal 160 is depressed, the PCU 150 may cause a notification to be displayed on the display panel 166 that is indicative of less than optimal regenerative energy being recovered because of the driver selected gear. For example, a reduced braking energy score or an energy difference from the optimal gear may be displayed. Such indications may aid in teaching the driver the energy impacts of such gear shifts.

In the economy mode, the response of the powertrain 112 may be depend on whether the upshift paddle shifter 162 or the downshift paddle shifter 164 is actuated. Further, the response of the powertrain 112 may depend on whether there is a demand for braking or not. The demand for braking may be ascertained from the brake pedal position signal when the brake pedal position signal exceeds a predetermined threshold. During the demand for braking, a request for an upshift or a downshift may be denied. The PCU 150 may be configured to automatically select an optimal gear for regenerative braking. The optimal gear may change during a braking event (e.g., as vehicle speed or braking demand changes). The PCU 150 may continue operating in the optimal gear for regenerative braking. Note that the PCU 150 may command a gear change to the optimal gear in this mode but it may not correspond to the driver selected gear. When the driver gear request is denied during a demand for braking, a color of the associated display element 166' may be changed to indicate that the gear change request was denied. For example, the color may change from yellow to red. In some configurations, the associated display element 166' may be flashed to indicate that the gear change request was denied. The flashing or color change of the display element 166' may be continued for a predetermined time after the request which has been denied. For example, the predetermined time may be two seconds or a time period that is long enough to catch the attention of the driver.

In some cases, the optimal gear may correspond to the driver requested gear. In these cases, the gear shift to the optimal gear is satisfied and no denial indication is displayed.

When there is no demand for braking from the driver, a request for an upshift (e.g., actuation of upshift paddle shifter 162) may be allowed. In response to the upshift request, the PCU 150 may be programmed to initiate an upshift of the gearbox 124. The PCU 150 may command the gearbox 124 to change gears according to the upshift request. In the event of a demand for braking, the PCU 150 may command the gearbox 124 to a gear that is optimal for regenerative braking which may be different than the driver requested gear.

The driver may request a downshift by actuating the downshift paddle shifter 164. One motivation for requesting the downshift may be to increase torque for decelerating the vehicle 110. Another motivation for requesting the downshift may be to increase torque for accelerating the vehicle 110. The desired behavior may depend upon the position of the accelerator pedal 152. For example, the driver likely desires an increase in braking torque when requesting a downshift while the accelerator pedal 152 is not applied. In contrast, if the accelerator pedal 152 is applied, the driver likely desires an increase in torque for accelerating the vehicle 110.

In the economy mode during an absence of demand for braking (e.g., the brake pedal 160 is not applied by the driver), a request for a downshift (e.g., actuation of downshift paddle shifter 164) may be inhibited. Instead of allowing a downshift resulting in a change of the transmission gear, the PCU 150 may be programmed to simulate a torque change that would occur during a downshift of the gearbox 124. The PCU 150 may command the M/G 118 to increase torque to decelerate or accelerate the vehicle 110. For example, when the accelerator pedal 152 is not applied, a regenerative torque command may be increased to decelerate the vehicle 110. When the accelerator pedal 152 is applied, a propulsive torque command may be increased to accelerate the vehicle 110.

During a coastdown condition (e.g., driver foot removed from both the accelerator pedal 152 and the brake pedal 160), a torque change from the M/G 118 may be used to substitute for the gearbox downshift. The presence of the coastdown condition may be detected based on the brake pedal 160 and the accelerator pedal 152. For example, the coastdown condition may be detected when the braking pedal position signal is indicative of an absence of demand for braking and the accelerator pedal position signal is indicative an absence of demand for acceleration. The regenerative torque requested from the M/G 118 may be configured to simulate the response of the vehicle 110 to a gearbox downshift. The result is that the M/G 118 operates as a generator and provides energy to be stored in the battery 120. In the event that a demand for braking is detected during the simulated downshift, additional regenerative torque may be requested from the M/G 118 up to a regenerative torque limit. During the demand for braking, the PCU 150 may command the gearbox 124 to change gears to an automatically selected gear that is optimized for recovering energy with the M/G 118. Once the demand for braking ceases, operation may continue with the simulated downshift. In the event that the battery 120 cannot receive additional energy (e.g., state of charge of the battery 120 exceeds a full threshold), the simulated downshift torque may be blended out and a downshift of the gearbox 124 may be commanded.

The PCU 150 may be programmed to determine a torque request for the M/G 118 to simulate the downshift. The torque request may be based on the gear ratios of a present gearbox gear and the requested gear. The input torque of the gearbox 124 may be at a torque level prior to the downshift request. The PCU 150 may compute the additional torque needed to simulate the downshift request. A torque factor of (G2-G1)/G1 may be applied to the torque level prior to the downshift to compute the additional torque command. Note that G2 is the requested downshift gear ratio and G1 is the present gear ratio. The additional torque may be configured to apply the same torque as an actual downshift. In this manner, the downshift may be simulated. During the simulated downshift, one of the display elements 166' may be configured to indicate that a simulated downshift is being performed.

The PCU 150 may be programmed to cease simulating the downshift under different conditions. In some configurations, the simulated downshift may be terminated when the accelerator pedal demand signal is indicative of a demand for acceleration. In some configurations, the simulated downshift may be terminated when the brake pedal demand signal transitions from a demand for braking to a demand for no braking.

Figure 2:
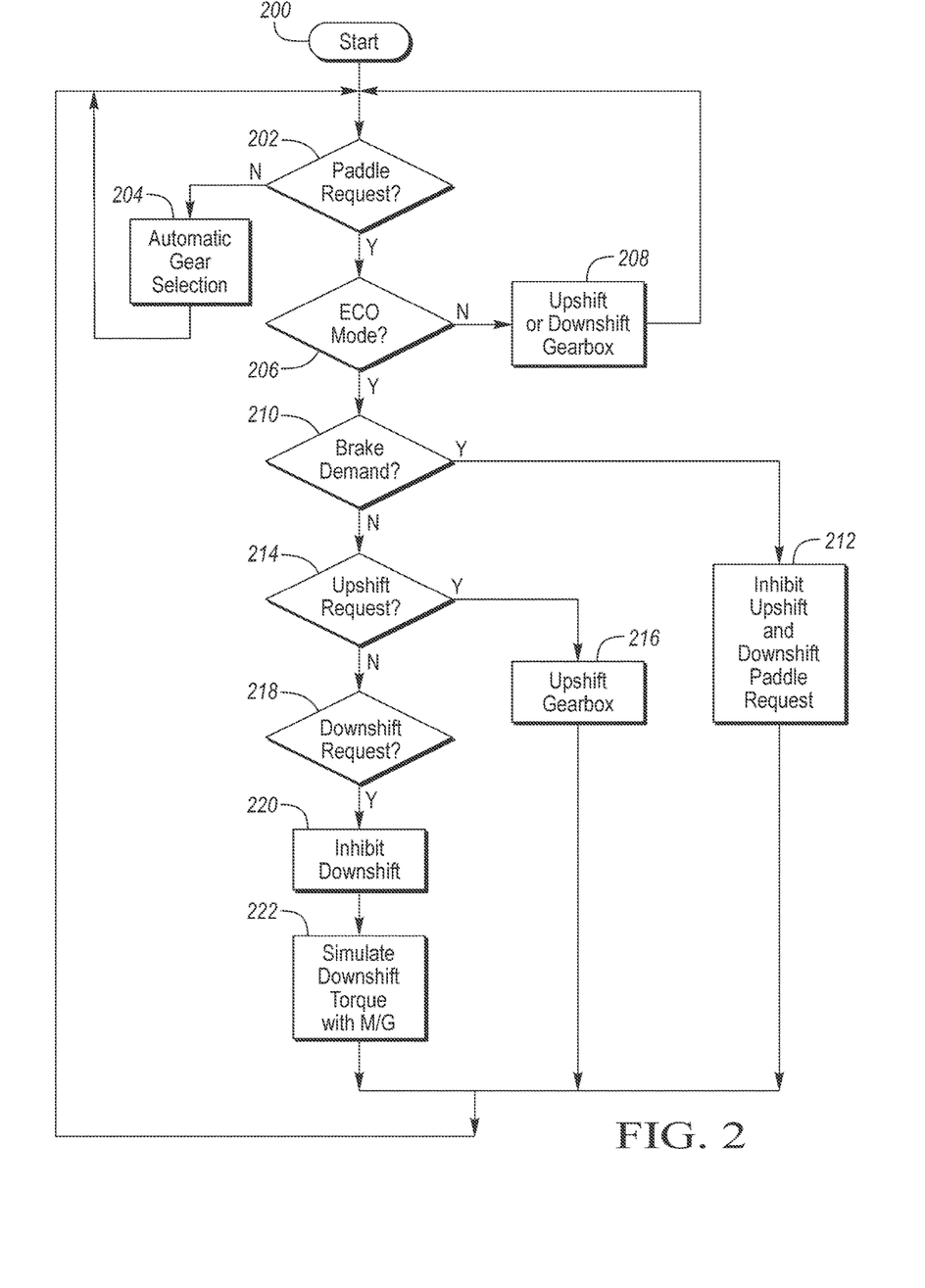
FIG. 2 is a flowchart for a sequence of operations for managing paddle shifter inputs.

FIG. 2 is a flowchart of a possible sequence of operations that may be implemented in a controller. The sequence starts at entry block 200. At operation 202, a check of the paddle shifters is made to determine if a paddle request (e.g., upshift or downshift) is present. If there is no paddle request, operation 204 may be performed. At operation 204, the gear for the gearbox 124 is automatically selected. The PCU 150 may be programmed to automatically select the gear based on various criteria that may include fuel economy and/or acceleration performance. In addition, the automatic gear selection criteria may be different in the economy mode than in a performance mode. The sequence may then return to operation 202.

The PCU 150 may receive one or more request signals from the paddle shifters 162, 164. If there is a paddle request (e.g., request signal indicative of driver desire to change gear), operation 206 may be performed. At operation 206, a check of the powertrain operating mode is performed. If the powertrain is operating in a mode other than the economy mode, operation 208 may be performed. At operation 208, the gearbox 124 may be upshifted or downshifted according to the paddle request.

If the powertrain is operating in the economy mode, operation 210 may be performed. At operation 210, a check of the brake demand may be performed. The PCU 150 may receive the brake demand signal from the brake pedal 160. If the brake demand signal is indicative of a demand for braking, operation 212 may be performed. At operation 212, upshifts and downshifts according to the paddle request are inhibited. That is, the gearbox will not be shifted in response to the paddle request. The sequence may then return to operation 202.

If the brake demand signal is indicative of an absence of a demand for braking, operation 214 may be performed. At operation 214, the request signal from the paddle shifters 162, 164 is checked for an upshift request. If the request signal is indicative of an upshift request, operation 216 may be performed. At operation 216, the upshift may be performed. Operation 216 may include those operations for upshifting the gearbox 124. The sequence may then return to operation 202.

If the paddle request is not an upshift request, then operation 218 may be performed. At operation 218, a check for a downshift request is performed. If the paddle request signal is indicative of a downshift request, operations 220 and 222 may be performed. At operation 220, the downshift request is inhibited. That is, the gearbox 124 is not downshifted in response to the downshift request. At operation 222, downshift torque may be simulated using the M/G 118. Operation 222 may include those instructions necessary to compute and transmit a desired torque command to the M/G 118. The sequence may then return to operation 202.

In the event that a driver requested gear change is denied, the PCU 150 may output a signal to the display panel 166 that is indicative of the gear change denial. One of the display elements 166' may be operated in response to indicate the gear change denial. The PCU 150 may output a signal to the display panel 166 that is indicative of a simulated downshift. One of the display elements 166' may be operated in response to indicate that a simulate downshift is in progress. The PCU 150 may output a signal to the display panel 166 that is indicative of a reduction in regenerative energy recovery performance. One of the display elements 166' may be operated in response to indicate the performance decrease to the driver.

Fuel economy may be improved by improved operation of manual gear selections in an economy mode. The prioritization of fuel economy over performance in the economy mode may result in manual gear selections being denied. However, the over fuel economy of the vehicle may be improved. Vehicle performance is not adversely affected as the driver may exit the economy mode at which time the gear requests will be honored.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure.

As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
a controller programmed to change a gear of a transmission in a hybrid powertrain in response to receiving a request from a paddle shifter and, in response to the hybrid powertrain operating in an economy mode and receiving the request in a presence of a brake demand signal indicative of a demand for braking, maintain the gear in an automatically selected gear.

2. The vehicle of claim 1 further comprising a lamp associated with the paddle shifter wherein the controller is further programmed to flash the lamp for a predetermined time after the request in response to maintaining the gear.

3. The vehicle of claim 1 further comprising a lamp associated with the paddle shifter wherein the controller is further programmed to change a color of the lamp for a predetermined time after the request in response to maintaining the gear.

4. The vehicle of claim 1 wherein the controller is further programmed to, in response to the hybrid powertrain operating in a mode other than the economy mode and receiving the request in an absence of the brake demand signal being indicative of the demand for braking, change the gear according to the request and decrease a performance score that is displayed to a driver.

5. The vehicle of claim 1 wherein the controller is further programmed to choose the automatically selected gear to maximize an amount of regenerative energy recovered by an electric machine in the hybrid powertrain.

6. The vehicle of claim 1 wherein the controller is further programmed to, in response to the request being a downshift request in a presence of brake demand and accelerator demand signals that are indicative of a coastdown condition, maintain the gear and change a torque of an electric machine to simulate an expected torque change due to downshifting.

7. The vehicle of claim 6 wherein the controller is further programmed to request the expected torque change based on a present gear of the transmission, a requested gear, and a present torque input to the transmission.

8. The vehicle of claim 6 wherein the controller is further programmed to cease simulating the expected torque change in response to the brake demand signal being indicative of a demand for braking or the accelerator demand signal being indicative of a demand for acceleration of the vehicle.

9. A hybrid powertrain comprising:
a controller programmed to change a gear of a transmission in response to receiving a request from a paddle shifter and, in response to the hybrid powertrain operating in an economy mode and receiving a downshift request in a presence of brake demand and accelerator demand signals indicative of a coastdown condition, increase a regenerative torque command for an electric machine by a predetermined amount without changing the gear.

10. The hybrid powertrain of claim 9 wherein the controller is further programmed to, in response to the brake demand signal being indicative of a demand for braking, increase the regenerative torque command of the electric machine according to the brake demand signal.

11. The hybrid powertrain of claim 9 wherein the controller is further programmed to, in response to a state of charge of a battery exceeding a battery full threshold, reduce the regenerative torque command and downshift the transmission.

12. The hybrid powertrain of claim 9 wherein the controller is further programmed to, in response to operating the hybrid powertrain in a mode other than the economy mode and receiving the downshift request in a presence of the brake demand signal being indicative of a demand for braking, downshift the transmission and decrease a performance score for display.

13. The hybrid powertrain of claim 9 wherein the controller is further programmed to increase the regenerative torque command by the predetermined amount that is based on a present gear of the transmission, a requested gear, and a present torque input to the transmission.

14. The hybrid powertrain of claim 9 wherein the controller is further programmed to cease requesting the regenerative torque command in response to the accelerator demand signal being indicative of a demand for acceleration.

15. A method comprising:
maintaining by a controller an automatically selected gear of a transmission of a hybrid powertrain in response to receiving a gear change request from a driver while the hybrid powertrain is operating in an economy mode and a brake demand signal is indicative of a demand for braking;
outputting by the controller a signal indicative of a gear change denial to a display; and
changing by the controller a gear of the transmission according to the automatically selected gear and ceasing to output the signal indicative of the gear change denial in response to the gear change request matching the automatically selected gear.

16. The method of claim 15 further comprising increasing by the controller a regenerative torque command to an electric machine and inhibiting the gear change request in response to the gear change request being a downshift request while the hybrid powertrain is operating in the economy mode and the brake demand signal is indicative of an absence of demand for braking and an accelerator demand signal is indicative of an absence of demand for acceleration.

17. The method of claim 15 further comprising shifting by the controller a gear from the automatically selected gear according to the gear change request in response to receiving the gear change request when the hybrid powertrain is operating in a mode other than the economy mode.

18. The method of claim 17 further comprising outputting by the controller a signal indicative of a decreased performance score in a presence of the brake demand signal being indicative of a demand for braking and the gear change request resulting in collection of less regenerative energy than operating in the automatically selected gear.

19. The method of claim 15 further comprising generating by the controller the automatically selected gear to minimize fuel consumption when the hybrid powertrain is operating in the economy mode.

\* \* \* \* \*